C. JONES.
PRICE COMPUTING ATTACHMENT FOR MEASURING FAUCETS.
APPLICATION FILED OCT. 20, 1909.
960,946.
Patented June 7, 1910.
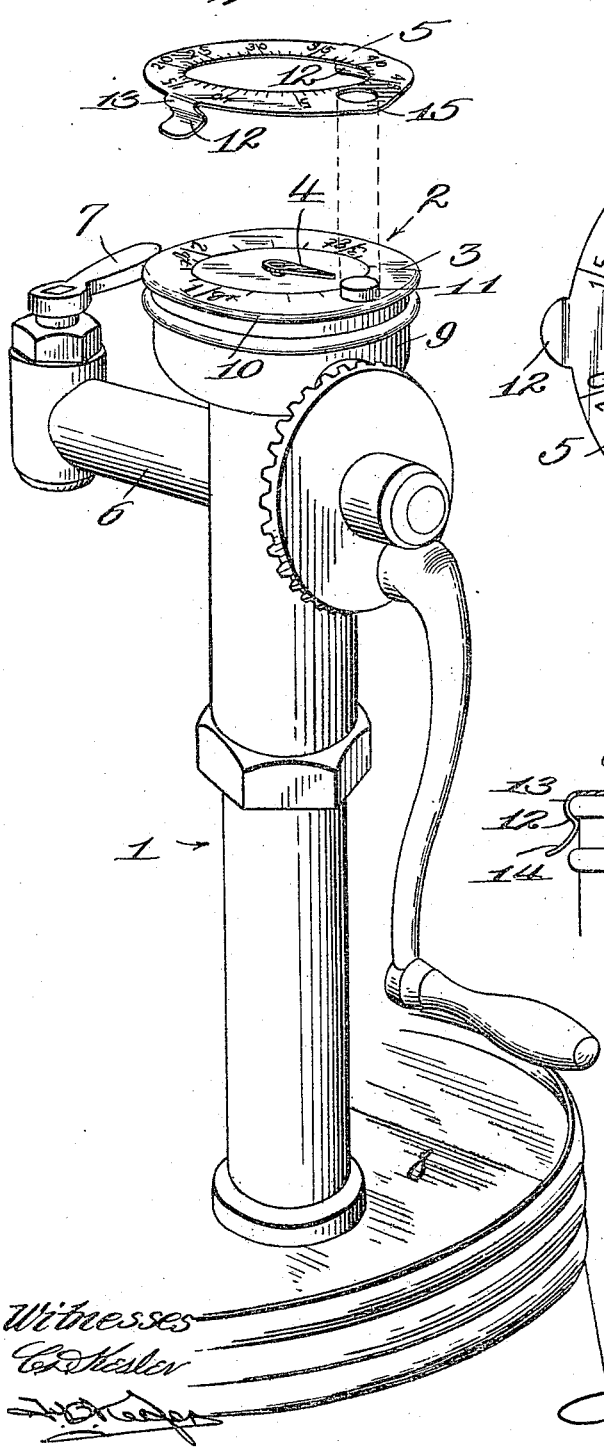
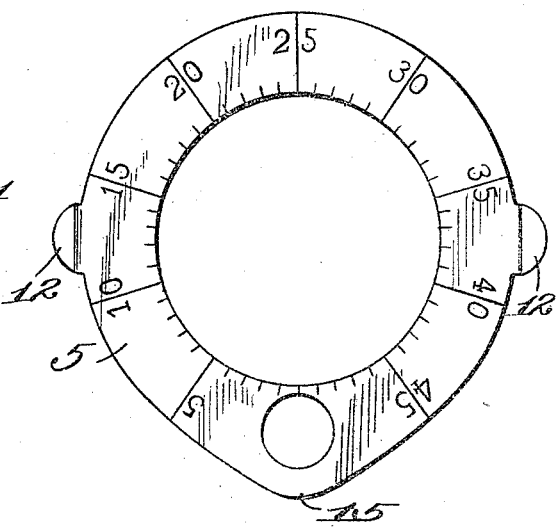
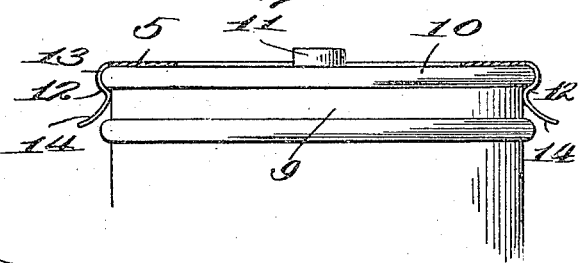
Inventor
Cabell Jones
By
James L. Norris
Atty.
Witnesses

UNITED STATES PATENT OFFICE.

CABELL JONES, OF SPRAY, NORTH CAROLINA.

PRICE-COMPUTING ATTACHMENT FOR MEASURING-FAUCETS.

960,946. Specification of Letters Patent. Patented June 7, 1910.

Application filed October 20, 1909. Serial No. 523,637.

*To all whom it may concern:*

Be it known that I, CABELL JONES, a citizen of the United States, residing at Spray, in the county of Rockingham and State of North Carolina, have invented new and useful Improvements in Price-Computing Attachments for Measuring-Faucets, of which the following is a specification.

The present invention is an improvement in price-computing attachments for measuring faucets, and it comprehends the production of an extremely simple and inexpensive graduated device for superposition upon the dial of the faucet in such a manner that its markings or graduations will register with those on the dial, whereby the pointer employed in conjunction with the latter will indicate not only the exact quantity of liquid drawn off through the faucet, but also the cost of such quantity.

The invention resides primarily in the particular construction of the device; in the provision of means for accurately positioning or centering the device with reference to the dial; and in the means employed for effecting its retention in such position.

The preferred embodiment of the invention is illustrated in the accompanying drawings, wherein:

Figure 1 is a perspective view illustrating the application of the invention, the price scale being shown as detached from the dial. Fig. 2 is an enlarged plan view of the scale. Fig. 3 is an enlarged fragmental side elevation of that portion of the faucet upon which the dial is formed, with said scale in place thereon, the latter being shown partly in section.

Before taking up the detailed description of the invention, attention is directed to the fact that the term "faucet" occurring throughout this specification and the appended claims is employed in its broadest sense, as indicative generically of a "device for controlling the flow of liquid from a receptacle or pipe by opening or closing an orifice." It may be stated, however, that the invention is designed primarily for use in connection with a molasses pump of the type which includes measuring mechanism, and that such construction is shown in said drawings.

Reference being had to the drawings, and to the numerals marked thereon, 1 designates in a general manner the faucet, i. e., the pump; 2 the measuring mechanism associated therewith and including the dial 3 and the pointer 4; 5, the price scale adapted for attachment to the faucet, as hereinafter described; and 6, the discharge spout of the faucet, said spout being provided with a valve (not shown) operated by a handle 7. The pump or faucet is shown in the present instance as mounted upon the top of a barrel 8 which contains the liquid to be dispensed.

The head 9 of the pump barrel upon which the dial 3 is marked or otherwise indicated, is formed with a peripheral bead 10 and with an upstanding stud 11, the latter being located directly opposite the zero point or mark on the dial. The graduations on the dial read in quarts and fractions thereof, while those on the price scale 5 read in monetary values, namely, cents, the number of graduations on both scales being the same.

The price scale 5 is in the form of a flat metal ring, provided at diametrically opposite points with a pair of depending spring clips 12, each of which is bent adjacent its upper end to conform to the contour of the bead 10, as indicated by the numeral 13. The lower portion 14 of each clip is outwardly curved, thereby providing a finger piece. The diameter of this ring is the same as that of the head upon which the dial is marked, and its width is such that the inner ends of the graduations on the dial project beyond the inner edge of said ring when the latter has been snapped in place upon the dial, or, in other words, the ring covers a part only of the graduations on the dial. Therefore, when the two series of graduations are brought into proper registration with each other, the graduations on the disk will serve as continuations or prolongations of the visible portions of those on the dial, and readings may be taken from both scales simultaneously.

In order to accurately position the ring with respect to the dial, that portion upon which the zero mark or point occurs is slightly elongated, as indicated by the numeral 15, and such portion has formed therein a perforation designed to receive the stud 11. This construction also assists in the retention of the ring in position upon the dial.

From the foregoing, it will be apparent that the ring with the price scale marked thereon may be readily attached to and detached from the dial-provided head of the pump, and that in the former instance the quantity of liquid drawn off through the spout will be accurately indicated by the pointer, as well as the cost of such quantity.

What is claimed is:

1. A computing attachment for measuring implements comprising a graduated ring adapted for superposition upon the dial of the implement, said dial being provided with a centering member, and said ring having a portion thereof elongated to constitute a means for centering the ring with respect to the dial, said elongated portion being provided with an opening adapted to receive said centering member.

2. A computing attachment for measuring implements comprising a graduated ring adapted for superposition upon the dial of the implement, the graduations on said ring registering with and forming continuations of those on said dial, and retaining clips provided upon said ring for removable engagement with the dial.

3. The combination, with a measuring implement having a dial, an indicator associated with the same, and a centering stud projecting from said dial; of a computing attachment comprising a graduated ring superposed on the dial, and provided with an opening designed to receive the stud and with retaining means adapted to engage the dial, the graduations on said ring registering with and forming continuations of those on said dial.

In testimony whereof I have hereunto set my hand in presence of two subscribing witnesses.

CABELL JONES.

Witnesses:
  W. A. JONES,
  W. E. FLYNN.